US 6,581,452 B2

(12) United States Patent
Nakano et al.

(10) Patent No.: US 6,581,452 B2
(45) Date of Patent: Jun. 24, 2003

(54) APPARATUS FOR MEASURING VOLUME UNDER MICROGRAVITY

(75) Inventors: Akihiro Nakano, Tsukuba (JP); Nobukazu Ohnishi, Tokyo (JP)

(73) Assignees: Agency of Industrial Science and Technology, Tokyo (JP); Japan Space Forum, Tokyo (JP); National Space Development Agency of Japan, Ibaraki (JP)

( * ) Notice: Subject to any disclaimer, the term of this patent is extended or adjusted under 35 U.S.C. 154(b) by 0 days.

(21) Appl. No.: 10/102,390

(22) Filed: Mar. 19, 2002

(65) Prior Publication Data

US 2003/0000299 A1 Jan. 2, 2003

(30) Foreign Application Priority Data

Jun. 21, 2001 (JP) ........................................ 2001-188155

(51) Int. Cl.$^7$ ........................... G01F 17/00; G01N 7/00; G01N 29/02; G01N 29/00
(52) U.S. Cl. ...................... 73/149; 73/19.01; 73/19.03; 73/19.05; 73/19.12; 73/24.01; 73/61.49; 73/61.79
(58) Field of Search ................................ 73/149, 19.01, 73/19.03, 19.05, 19.12, 24.01, 24.06, 38, 61.41, 61.43, 61.45, 61.49, 61.79, 64.53, 64.47, 32 R

(56) References Cited

U.S. PATENT DOCUMENTS 4,324,131 A * 4/1982 Rosencwaig ............... 73/61.58
4,395,902 A * 8/1983 Espenscheid et al. ...... 73/19.11
5,661,248 A * 8/1997 Bernicot et al. .......... 73/861.04

FOREIGN PATENT DOCUMENTS

| JP | 359020814 | * | 2/1984 | .................. 73/149 |
| JP | 363113315 A | * | 5/1988 | .................. 73/861 |
| JP | 06-201433 | | 7/1994 | |
| JP | 06-201434 | | 7/1994 | |
| JP | 07 083730 | | 3/1995 | |
| JP | 08-327429 | | 12/1996 | |
| JP | 02000171281 A | * | 6/2000 | |

OTHER PUBLICATIONS

Nakano, A; Murakami, M, Investigation of technique for measuring liquid volume under micro–gravity conditions, National Insitute of AIST Research Inst. of Energy Utilization Thermal Engineering, Cryoqenics v 41 n Nov./Dec. 11–12, 2001, p 817–823.*

* cited by examiner

Primary Examiner—Helen Kwok
Assistant Examiner—Katina Wilson
(74) Attorney, Agent, or Firm—Knobbe, Martens Olson & Bear LLP

(57) ABSTRACT

Volume measuring apparatus is used in a closed space as in the case of volume measurement of liquid in a container placed on an orbit of an artificial satellite and permits the volume measurement in a state without mixture with gas, liquid, or solid. A volume measuring apparatus is an apparatus for measuring the volume of liquid or solid under microgravity, which has two or more containers coupled to each other by a pipe, a device for separating or fixing a gas phase, a liquid phase, or a solid phase, a pressure fluctuation source, a pressure signal receiver, a pressure gage, and a thermometer, wherein the separating or fixing device, the pressure fluctuation source, the pressure signal receiver, the pressure gage, and the thermometer are placed in the containers and wherein the pressure fluctuation source, the pressure signal receiver, the pressure gage, and the thermometer are connected to a signal analyzing unit.

10 Claims, 7 Drawing Sheets

APPARATUS FOR MEASURING VOLUME UNDER MICROGRAVITY

BACKGROUND OF THE INVENTION

1. Field of the Invention

The present invention generally belongs to the field of space environment technology and relates to measurement of the volume of liquid or solid under microgravity. More particularly, the invention concerns volume measuring apparatus for volume measurement under microgravity applicable even in vacuum surroundings, e.g., on an orbit of an artificial satellite.

2. Related Background Art

The technology about the measurement of the volume of liquid with sound is already known, for example, as described in Japanese Patent Applications Laid-Open No. 08-327429 and No. 07-83730. The known devices described in these applications both are comprised of a container and a pipe communicating with an open space at one end. The measurement is carried out by a method of generating sound by a speaker or the like, collecting the Helmholtz resonant sound induced by spring action of the gas phase in the pipe and container, by a microphone, and calculating the volume of liquid from the resonance frequency of the Helmholtz resonant sound. There are also devices in which two containers are coupled to form a closed space and in which pressure fluctuations are detected to determine the volume of liquid, for example, as described in Japanese Patent Applications Laid-Open No. 06-201433 and No. 06-201434.

For measuring the volume of a liquid or the like in a container placed on an orbit of an artificial satellite, it is, however, first necessary to create a closed space, because the surroundings are a vacuum. The prior arts making use of the Helmholtz resonance had the critical defect that the devices were applicable only in the open space. The prior arts of measuring the volume of liquid or the like by detecting the pressure fluctuations were applicable to the use in the closed space, but had the problem that, because there occurred mixture of gas and liquid under microgravity, a device for controlling it was indispensable.

SUMMARY OF THE INVENTION

An object of the present invention is to provide volume measuring apparatus that can be used in the closed space as in the case of the measurement to measure the volume of liquid or solid in a container placed on an orbit of an artificial satellite and that can measure the volume of liquid or solid in a state without mixture with a gas phase, a liquid phase, or a solid phase.

A volume measuring apparatus according to the present invention is an apparatus for measuring volume under microgravity, comprising two or more containers, a pipe coupling the containers to each other, means for separating or fixing a gas phase, a liquid phase, or a solid phase, a pressure fluctuation source, and a pressure fluctuation signal receiver, wherein the separating or fixing means, pressure fluctuation source, and pressure fluctuation signal receiver are placed in the containers, and wherein the pressure fluctuation source and the pressure variation signal receiver are connected to a signal analyzing unit.

Another volume measuring apparatus according to the present invention is an apparatus for measuring volume under microgravity, comprising two or more containers, a pipe coupling the containers to each other, means for separating a gas phase or a liquid phase, a sound source, a sound receiver, a thermometer, and a pressure gage, wherein the separating means, sound source, sound receiver, thermometer, and pressure gage are placed in the containers, and wherein the sound source is connected to a signal generator, the sound receiver is connected to a signal processor, and the signal processor, thermometer, and pressure gage are connected to a volume analyzer.

Still another volume measuring apparatus according to the present invention is an apparatus for measuring volume under microgravity, comprising two or more containers, a pipe coupling the containers to each other, means for separating a gas phase or a liquid phase, a pressure fluctuation source, a pressure gage, and a thermometer, wherein the separating means, pressure fluctuation source, pressure gage, and thermometer are placed in the containers, and wherein the pressure fluctuation source is connected to a signal generator, and the pressure gage and thermometer are connected to a signal analyzer.

The volume measuring apparatus according to the present invention is also characterized in that means for fixing a solid phase is provided in the containers.

The volume measuring apparatus according to the present invention is also characterized in that a container is partitioned into two or more compartments by a partition and the compartments are connected to each other by a pipe.

DESCRIPTION OF THE PREFERRED EMBODIMENTS

The embodiments of the present invention will be described below on the basis of the drawings.

Figure 1:
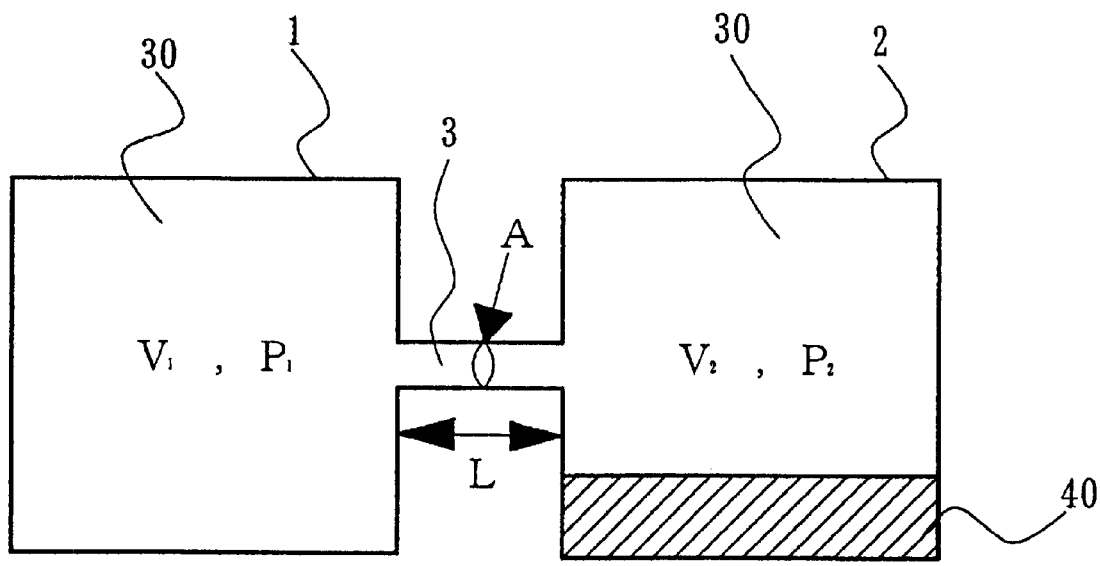
FIG. 1 is a drawing to illustrate the principle of the present invention.

FIG. 1 is a drawing to illustrate the principle of the present invention by an example of the volume measurement of liquid.

The present invention is characterized in that two or more containers 1, 2 are coupled to each other by a pipe 3 to form a closed space and in that a device for separating the gas phase from the liquid phase, which will be described hereinafter, is provided in the containers to separate the gas phase 30 from the liquid phase 40 and thereby enable the measurement of the volume of the liquid phase 40 with sound under microgravity.

For simplicity, assuming isothermal change, incompressible fluid, and no consideration to correction for the length of the neck tube part, the equation of motion is given as follows.

$$\rho L \frac{du}{dt} = p_1 - p_2 \quad (1)$$

In this equations, fluctuating pressures $P_1$, $P_2$ can be each expressed as follows.

$$p_1 = -\gamma P_0 \int (Au/V_1) dt \quad (2)$$

$$p_2 = \gamma P_0 \int (Au/V_2) dt \quad (3)$$

In the above equations, $\gamma$ represents the ratio of specific heats, $P_0$ the equilibrium pressure, L the length of the neck tube, A the cross section of the neck tube, u the velocity, and $V_1$ and $V_2$ the respective volumes of the gas phases 30 in the container 1 and in the container 2. The volumes $V_1$, $V_2$ can be determined by measuring these pressure fluctuations.

The following equation can be derived by substituting Equations (2) and (3) into Equation (1).

$$\rho L \frac{du}{dt} = -\gamma P_0 A \left( \frac{1}{V_1} + \frac{1}{V_2} \right) \int u \, dt \quad (4)$$

By defining $u = Ue^{i\omega t}$ and substituting it into Eq (4), the following equation can be derived with respect to the angular velocity $\omega$.

$$\omega^2 = \frac{\gamma P_0 A}{\rho L} \left( \frac{1}{V_1} + \frac{1}{V_2} \right) \quad (5)$$

Since the sound velocity c is expressed by the square root of $(\gamma P_0/\rho)$, the Helmholtz resonance frequency f in this case is given as follows.

$$f = \frac{c}{2\pi} \sqrt{\frac{A}{L} \left( \frac{1}{V_1} + \frac{1}{V_2} \right)} \quad (6)$$

In the above equation $2\pi$ is a constant, and the cross section A of the neck tube, the length L of the neck tube, and the volume $V_1$ of the gas phase in the container 1 are known quantities. The sound velocity c can be determined from temperature and pressure.

Since a change of $V_2$ appears as a change of frequency f, analysis of this frequency variation allows us to determine the amount of the liquid in the container 2. On that occasion, there occurs mixture of the gas phase and the liquid phase under microgravity, and thus a gas-liquid separating device making use of surface tension, e.g., consisting of mesh, grooves, or baffles, is set inside the containers, which first realizes practical measurement of the volume of the liquid with sound under microgravity.

Figure 2:
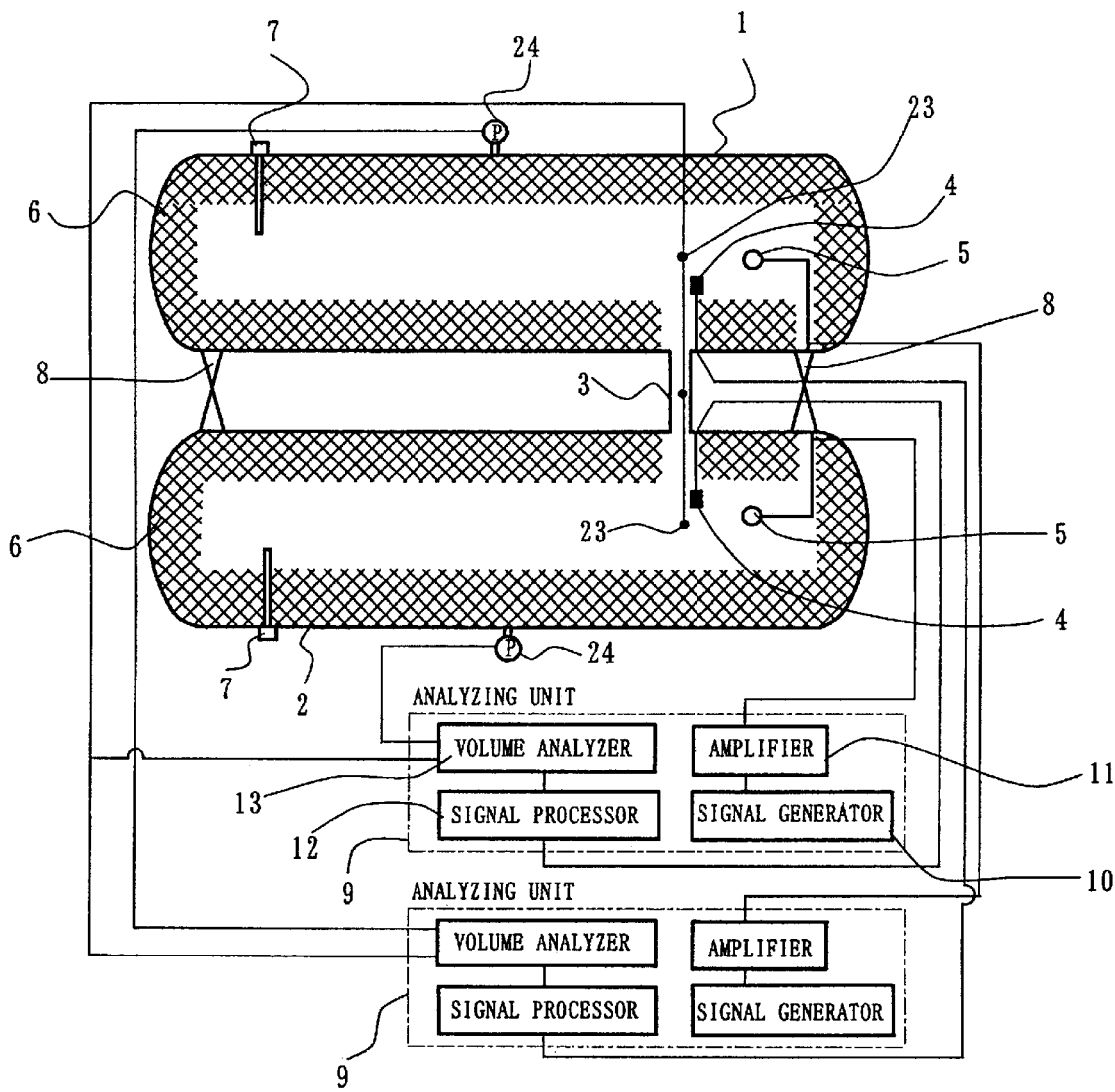
FIG. 2 is a front view to show the first embodiment of the present invention.

FIG. 2 shows the first embodiment of the present invention, in which a container 1 above and a container 2 below are integrally supported by supports 8 and a pipe 3 connects interiors of the container 1 and container 2 with each other. The number of containers can be two or more and they are connected with each other by a pipe or pipes.

The gas-liquid separating device 6 for separating the gas from the liquid, for example, by making use of surface tension is provided inside each of the container 1 and the container 2. This gas-liquid separating device 6 can be any means capable of separating the gas from the liquid; for example, a porous material such as a mesh material, steel wool, sponge, or a wick material is placed in an appropriate thickness along the internal walls of the containers, or grooves are formed in the internal walls of the containers, or baffles or the like are used to compose the separating device.

Microphones 4, 4 are provided as sound receivers in the gas phases inside the container 1 and the container 2 and are connected to their respective signal processors 12 in sound signal analyzing units 9. Speakers 5, 5 are provided as sound sources in the gas phases inside the container 1 and the container 2 and are connected to their respective amplifiers 11 of signal generators 10 in the sound signal analyzing units 9. In order to gain large sound signals, it is preferable to place the speakers in the gas phases and inject sound into the gas phases. Pressure regulating valves 7, 7 are provided inside the respective containers 1 and 2 to regulate pressures in the containers, and thermometers 23, 23 and pressure gages 24, 24 are also disposed in the respective containers 1, 2.

Each sound signal analyzing unit 9 consists of a signal generator 10, an amplifier 11, a signal processor 12, and a volume analyzer 13, and signals from the thermometer 23 and pressure gage 24 are fed into the volume analyzer 13 in order to determine accurate sound velocity. There are two sound signal analyzing units 9, 9 provided corresponding to the respective containers 1 and 2.

The apparatus described above is a closed system and can be used under a special environment, e.g., on an orbit of an artificial satellite.

In each sound signal analyzing unit 9 the signal generator 10 generates a swept frequency signal and the amplifier 11 amplifies the signal to supply the amplified signal to the speaker 5, thereby inducing the Helmholtz resonance inside the container 1, 2. The two speakers do not always have to be actuated simultaneously, but either one of the speakers can be actuated at a time.

The sound signal is collected by each microphone 4 and is subjected to the FFT (Fast Fourier Transform) analysis in the signal processor 12 to determine the resonance frequency f. The volume analyzer 13 calculates the volume of the measured object from the resonance frequency f and the sound velocity c.

Figure 3:
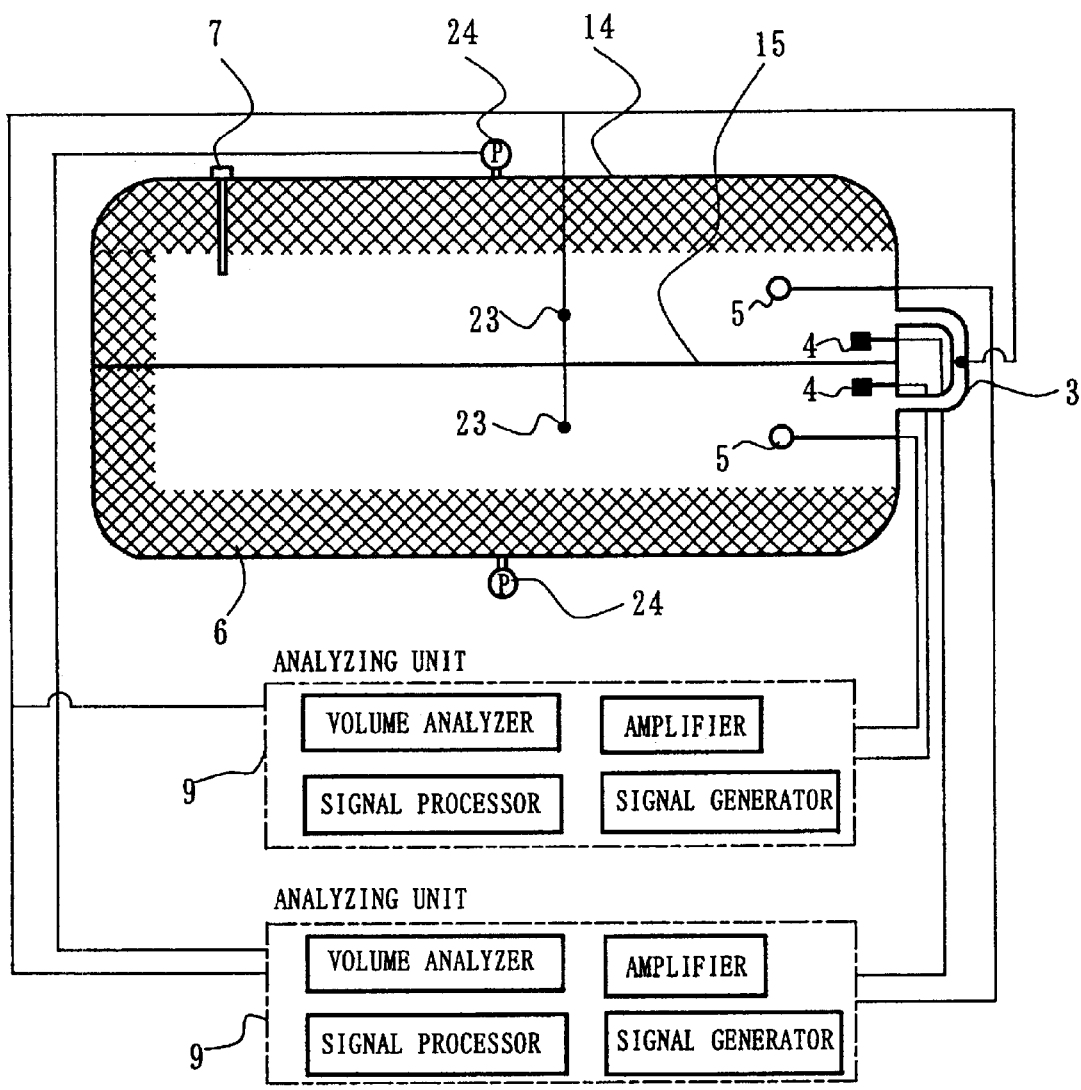
FIG. 3 is a front view to show the second embodiment of the present invention.

FIG. 3 shows the second embodiment of the present invention, in which one container 14 is partitioned into two compartments by a partition 15 and the compartments are connected by a pipe 3. The same reference numerals as those shown in FIG. 2 denote the same members as in FIG. 2, and the measurement procedure is also the same as in the case of FIG. 2.

Figure 4:
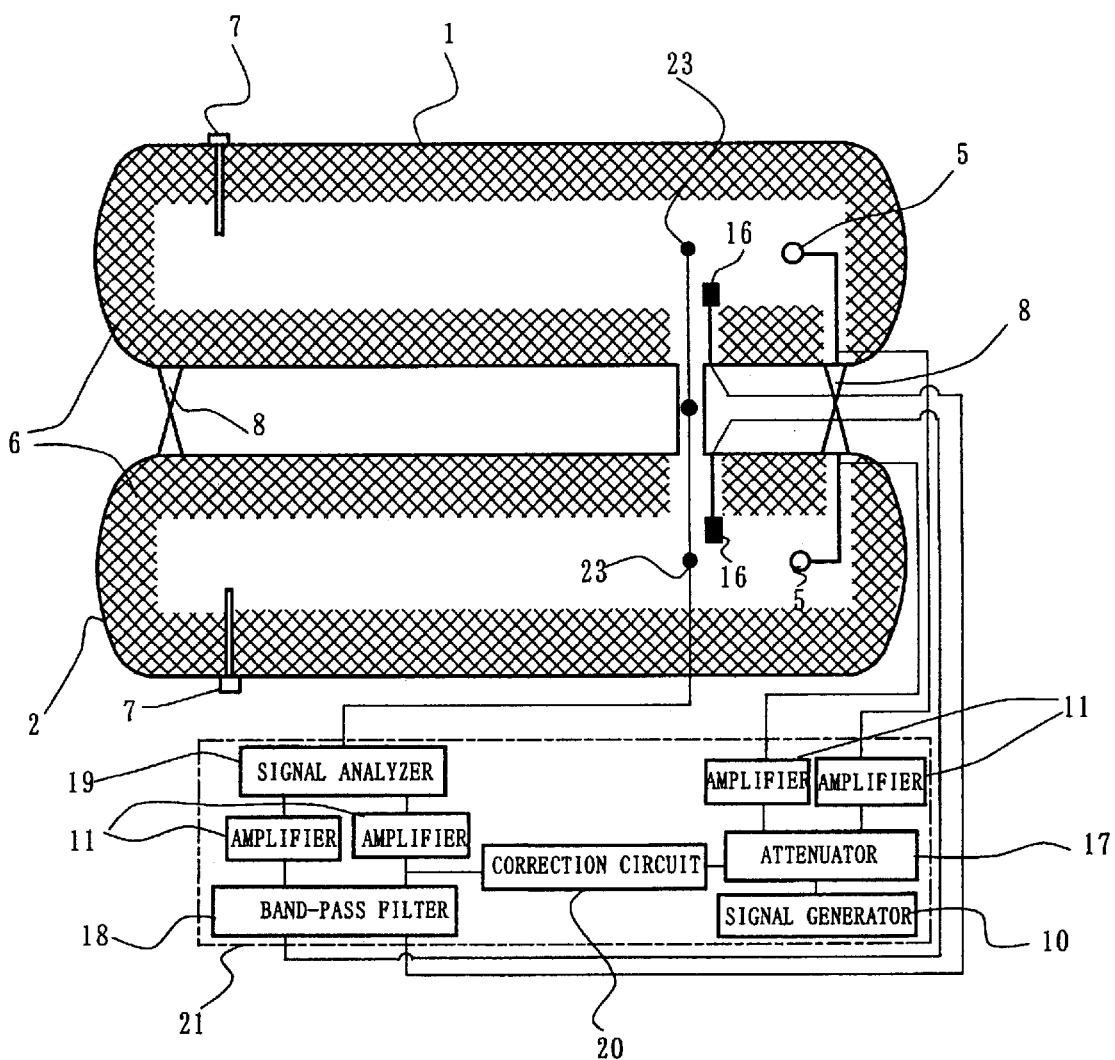
FIG. 4 is a front view to show the third embodiment of the present invention.

FIG. 4 shows the third embodiment of the present invention, which is an apparatus adapted for the measurement making use of pressure fluctuations applicable in the closed space. Namely, the volume measurement of liquid under microgravity is substantiated by combination of the gas-liquid separating device with a method of detecting the amount of liquid from the ratio of fluctuating pressures in two containers, measured with high-precision pressure gages.

In FIG. 4, the gas-liquid separating devices 6 are disposed in the interiors of the containers 1 and 2 located above and below. The speakers 5, 5 are provided as pressure fluctuation sources in the respective gas phases inside the container 1 and the container 2 and are connected to two amplifiers 11, 11, respectively. The amplifiers 11, 11 are connected each via an attenuator 17 to the signal generator 10 in a pressure signal analyzing unit 21. The high-precision pressure gages 16, 16 are provided in the respective gas phases inside the container 1 and the container 2 and detect pressure waves resulting from pressure fluctuations caused in the container 1 and in the container 2 by the speaker 5. Then these pressure signals are passed through a band-pass filter 18 of the pressure signal analyzing unit 21 and then are amplified. The amplified pressure signals are fed into a signal analyzer 19. After that, the volume of liquid is determined from the ratio of the pressure fluctuations of the two signals at the signal analyzer 19. Temperature signals from the thermometers 23 are also fed into the signal analyzer 19 in order to take account of and make correction for influence from the ratio of specific heats in the two containers. A correction circuit 20 is a device for controlling the output from the speakers so as to keep constant the amplitude of the pressure detected by either one pressure gage of the reference side.

The pressure signal analyzing unit 21 is composed of the signal generator 10, amplifiers 11, attenuator 17, band-pass filter 18, signal analyzer 19, and correction circuit 20. The containers can be replaced by the one of the type partitioned by the partition as shown in FIG. 3. In the case where a very-low temperature cryogen is confined in the containers, it is also possible to utilize the cold of the cryogen and apply high-precision pressure gages making use of superconducting sensors such as the SQUID (Superconducting QUantum Interference Device).

Figure 5:
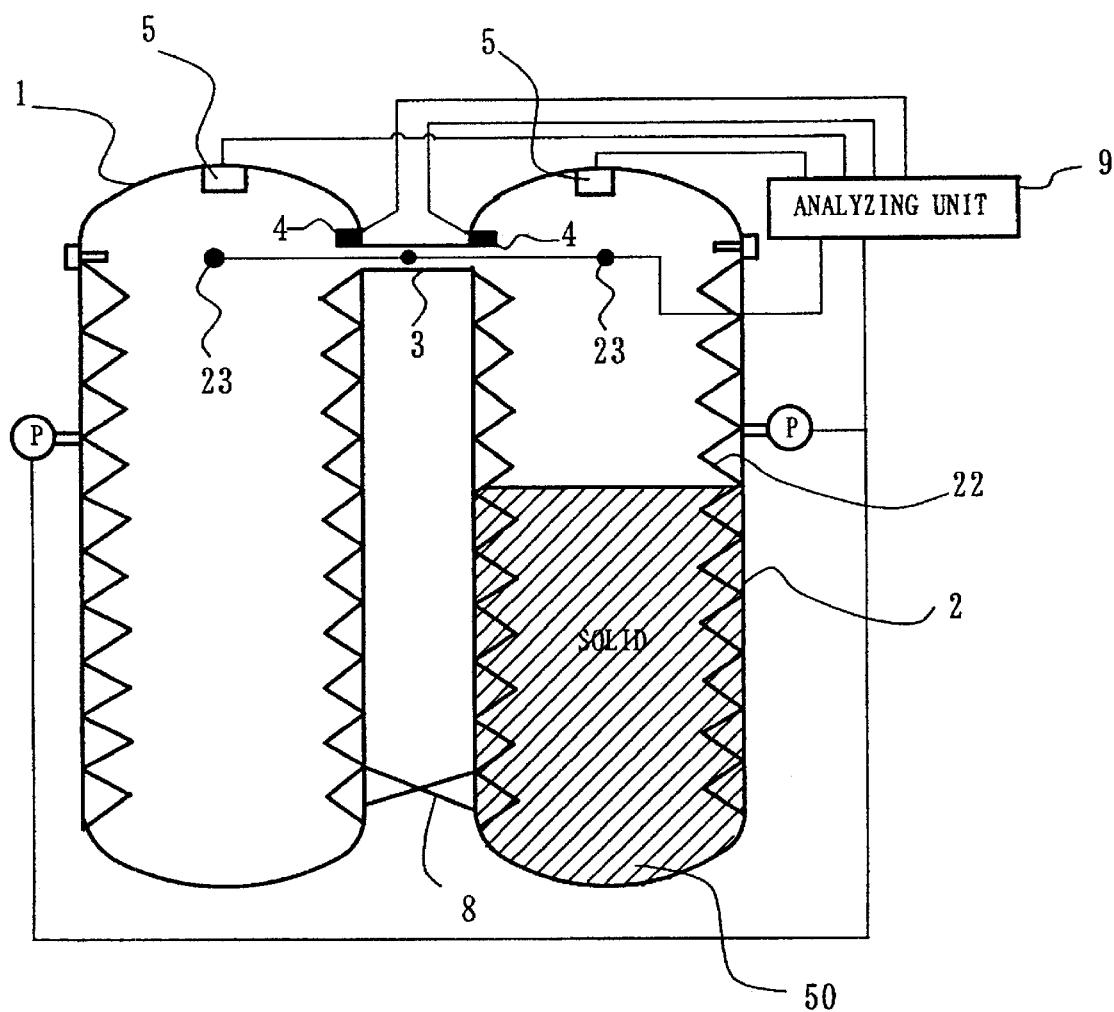
FIG. 5 is a front view to show the fourth embodiment of the present invention.

FIG. 5 shows the fourth embodiment as an application of the technology about the volume measurement of liquid shown in FIG. 2 or FIG. 4, to the measurement of the volume of solid.

The pipe 3 connects the interiors of the two containers 1, 2 arranged laterally side by side and the two containers are integrally fixed by the supports 8. Inside the containers 1, 2, there is provided a solid fixing device 22 for fixing the solid phase, e.g., ice 50. This solid fixing device 22 functions to fix the solid like ice to one end of the container and thus form a continuous space without solid so as not to interfere with the volume measurement based on the sound or pressure fluctuations; for example, the solid fixing device 22 may be substantiated by fixing a member with continuous projections and depressions to the internal walls of the containers or by forming continuous projections and depressions in the internal walls of the containers.

The same reference symbols as those in FIG. 2 denote the same members as in FIG. 2 and the measurement procedure is also the same as in the case of FIG. 2.

Figure 6:
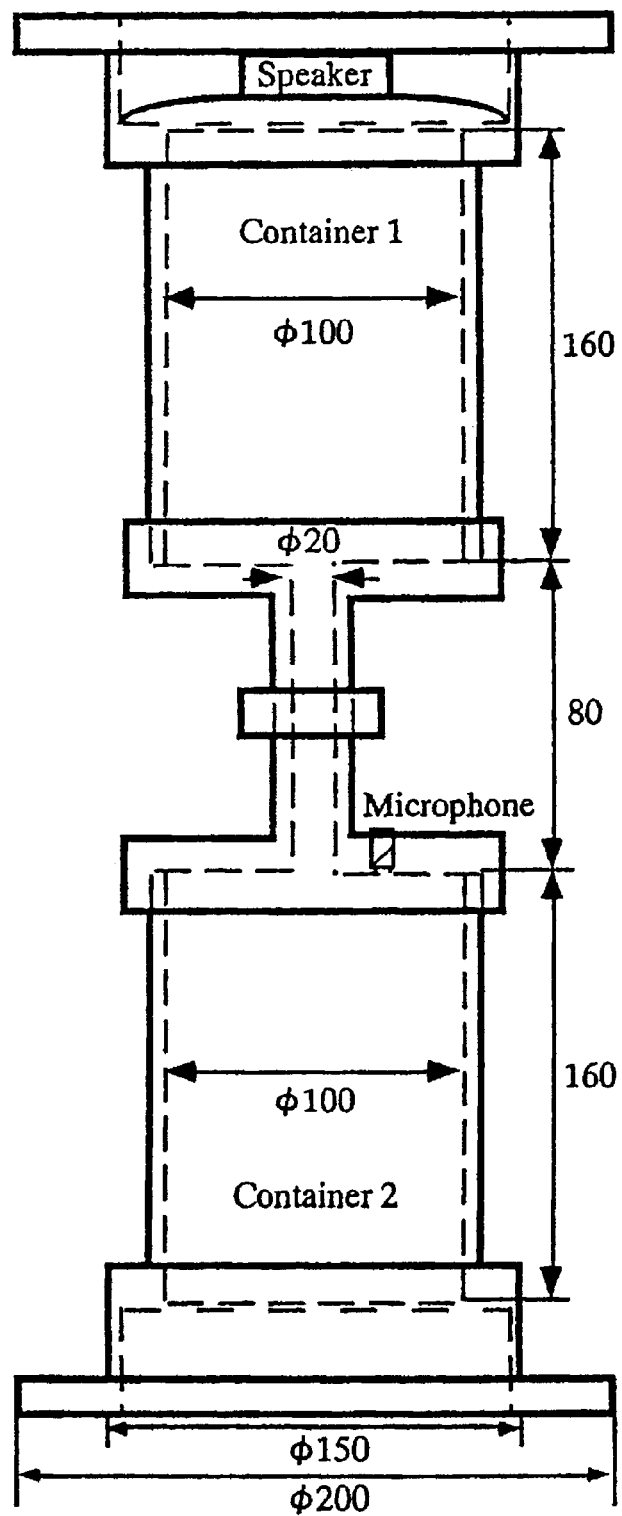
FIG. 6 is a diagram to show an experimental setup used in the experiment of Helmholtz resonance in a closed system.

An experiment was conducted with water in order to check the Helmholtz resonance in the closed system as described above. FIG. 6 shows an experimental setup used in the experiment, in which the volume of the container 1 loaded with a speaker for injecting sound waves is equal to the volume of the container 2 containing the liquid.

Figure 7:
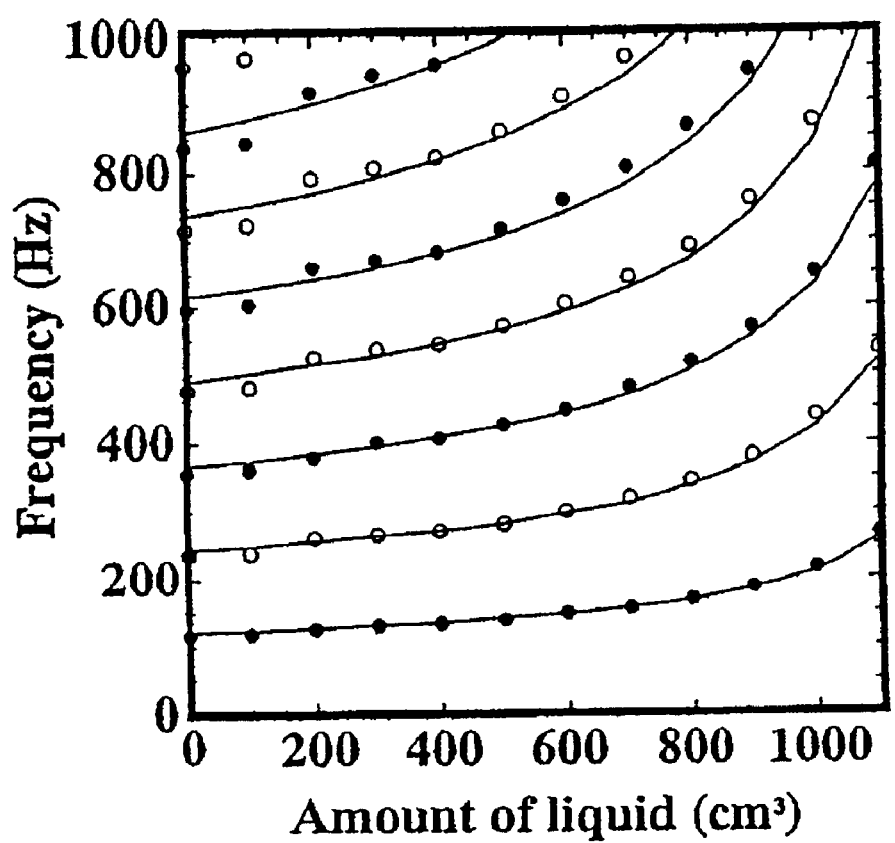
FIG. 7 is a graph to show the results of the experiment.

FIG. 7 presents the results of the experiment. It is apparent from this graph that the fundamental frequency of Helmholtz resonance and harmonics thereof were detected. The solid lines in the graph represent theoretical values calculated from Eq (6)with the correction factor of the neck tube length and it is clear that the experimental values substantially agree with the theoretical values.

Accordingly, the experiment verified that the Helmholtz resonance also occurred in the closed containers.

As described above, the present invention made it feasible to implement the volume measurement with sound in the closed space by the use of two or more containers and to implement the measurement of the volume of liquid or solid with sound under microgravity by the combination with the device for separating or fixing the gas phase, the liquid phase, or the solid phase.

It is also feasible to realize practical utilization of the volume measurement under microgravity by provision of the device for separating or fixing the gas phase, the liquid phase, or the solid phase in the volume measurement making use of the pressure fluctuations.

Since the apparatus is simple, it is feasible to implement the measurement on a maintenance-free basis, over a long period of time, and at low cost. For example, when compared with the invention described in Japanese Patent Application Laid-Open No. 2001-66175, the present invention eliminated the necessity for a plurality of vibration generators and detectors per container. Therefore, the apparatus of the present invention can be constructed at lower cost.

Superfluid helium (He II) is now used as a cryogen for cooling infrared detectors in deep space surveillance, on satellite orbits. For measuring the volume of the liquid, while cooling is necessary, the method actually adopted is one of heating the liquid with a heater and estimating the volume from the relation between temperature rise and specific heat. The present invention can also provide a noticeable improvement from such an inefficient measurement method.

The measuring means of the present invention can be applied, not only to the volume measurement of liquid, but also to the volume measurement of solid. ASTRO-E, which is a joint program by NASA of USA and The Institute of Space and Astronautical Science (ISAS) of Japan, employs a technique of cooling an X-ray detector with solid neon, and application of the present invention thereto will also permit measurement of the residual quantity of such a solid coolant.

What is claimed is:

1. An apparatus for measuring volume under microgravity, comprising two or more containers each having a closed interior, a pipe connecting the interiors of said containers to each other to form a single closed interior, means for separating or fixing a liquid phase or a solid phase from a gas phase, a pressure fluctuation source for emitting a pressure fluctuation signal to the gas phase wherein the signal propagates in the gas phase present in the signal closed interior, and a pressure fluctuation signal receiver, wherein said separating or fixing means, pressure fluctuation source, and pressure fluctuation signal receiver are placed in each container, and wherein the pressure fluctuation source and the pressure fluctuation signal receiver are connected to a signal analyzing unit.

2. An apparatus for measuring volume under microgravity, comprising two or more containers, a pipe coupling said containers to each other, means for separating a gas phase or a liquid phase, a sound source, a sound receiver, a thermometer, and a pressure gage, wherein said separating means, sound source, sound receiver, thermometer, and pressure gage are placed in the containers, and wherein said sound source is connected to a signal generator, said sound receiver is connected to a signal processor, and said signal processor, thermometer, and pressure gage are connected to a volume analyzer.

3. The apparatus according to claim 2, wherein said containers are comprised of such a configuration that a container is partitioned into two or more compartments by a partition and that said compartments are connected to each other by a pipe.

4. The apparatus according to claim 2, wherein means for fixing a solid phase is placed in the containers, instead of said means for separating the gas phase or the liquid phase.

5. The apparatus according to claim 4, wherein said containers are comprised of such a configuration that a container is partitioned into two or more compartments by a partition and that said compartments are connected to each other by a pipe.

6. An apparatus for measuring volume under microgravity, comprising two or more containers each having a closed interior, a pipe connecting the interiors of said containers to each other to form a single closed interior, means for separating a gas phase from a liquid phase, a pressure fluctuation source for emitting a pressure fluctuation signal to the gas phase wherein the signal propagates in the gas phase present in the signal closed interior, a pressure gage for receiving the pressure fluctuation signal, and a thermometer, wherein said separating means, pressure fluctuation source, pressure gage, and thermometer are placed in each container, and wherein said pressure fluctuation source is connected to a signal generator, and said pressure gage and thermometer are connected to a signal analyzer.

7. An apparatus for measuring volume under microgravity, comprising two or more containers, a pipe coupling said containers to each other, means for separating a gas phase or a liquid phase, a pressure fluctuation source, a pressure gage, and a thermometer, wherein said separating means, pressure fluctuation source, pressure gage, and thermometer are placed in the containers, and wherein said pressure fluctuation source is connected to a signal generator, and said pressure gage and thermometer are connected to a signal analyzer, wherein means for fixing a solid phase is placed in the containers, instead of said means for separating the gas phase or the liquid phase.

8. The apparatus according to claim 7, wherein said containers are comprised of such a configuration that a container is partitioned into two or more compartment by a partition and that said compartments are connected to each other by a pipe.

9. An apparatus for measuring volume under microgravity, comprising two or more containers each having a closed interior, a pipe connecting the interiors of said containers to each other to form a single closed interior, means for separating or fixing a liquid phase or a solid phase from a gas phase, a pressure fluctuation source for emitting a pressure fluctuation signal to the gas phase wherein the signal propagates in the gas phase present in the signal closed interior, and a pressure fluctuation signal receiver, wherein said separating or fixing means, pressure fluctuation source, and pressure fluctuation signal receiver are placed in each container, and wherein the pressure fluctuation source and the pressure fluctuation signal receiver are connected to a signal analyzing unit, wherein said containers are comprised of such a configuration that a container is partitioned into two or more compartments by a partition and that said compartments are connected to each other by a pipe.

10. An apparatus for measuring volume under microgravity, comprising two or more containers each having a closed interior, a pipe connecting the interiors of said containers to each other to form a single closed interior, means for separating a gas phase from a liquid phase, a pressure fluctuation source for emitting a pressure fluctuation signal to the gas phase wherein the signal propagates in the gas phase present in the signal closed interior, a pressure gage for receiving the pressure fluctuation signal, and a thermometer, wherein said separating means, pressure fluctuation source, pressure gage, and thermometer are placed in each container, and wherein said pressure fluctuation source is connected to a signal generator, and said pressure gage and thermometer are connected to a signal analyzer, wherein said containers are comprised of such a configuration that a container is partitioned into two or more compartments by a partition and that said compartments are connected to each other by a pipe.

* * * * *